United States Patent
Yao et al.

(10) Patent No.: US 12,278,788 B2
(45) Date of Patent: Apr. 15, 2025

(54) TIME DOMAIN WINDOW DETERMINATION FOR WIRELESS COMMUNICATION

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/776,703

(22) PCT Filed: Sep. 23, 2021

(86) PCT No.: PCT/CN2021/119752
§ 371 (c)(1),
(2) Date: May 13, 2022

(87) PCT Pub. No.: WO2023/044635
PCT Pub. Date: Mar. 30, 2023

(65) Prior Publication Data
US 2024/0063984 A1 Feb. 22, 2024

(51) Int. Cl.
*H04L 5/00* (2006.01)
*H04L 1/1829* (2023.01)

(52) U.S. Cl.
CPC .......... *H04L 5/0094* (2013.01); *H04L 1/1861* (2013.01)

(58) Field of Classification Search
CPC ... H04L 5/0094; H04L 1/1861; H04L 5/0048; H04L 5/14; H04L 5/0091; H04W 72/51;
(Continued)

(56) References Cited

U.S. PATENT DOCUMENTS

2017/0338942 A1 11/2017 Stanciu et al.
2018/0234997 A1 8/2018 Hosseini et al.
(Continued)

FOREIGN PATENT DOCUMENTS

CN 108702749 A 10/2018
WO 2020030269 A1 2/2020

OTHER PUBLICATIONS

Extended European Search Report for EP Patent Application No. 21899288.1; 7 pages; Oct. 4, 2022.
(Continued)

*Primary Examiner* — Rina C Pancholi
(74) *Attorney, Agent, or Firm* — Kowert, Hood, Munyon, Rankin & Goetzel, P.C.

(57) ABSTRACT

This disclosure relates to techniques for performing wireless communications including determination of actual time windows for maintaining power consistency and/or phase continuity associated with transmission between a user equipment (UE) and a base station. Techniques for determining the length, begging, and end of such windows are disclosed. A UE and/or base station may use various rules to determine the window(s).

20 Claims, 8 Drawing Sheets

(58) Field of Classification Search
CPC . H04W 72/535; H04W 72/0446; H04W 8/24; H04W 72/1268; H04W 72/21; H04W 72/232
See application file for complete search history.

(56) References Cited

U.S. PATENT DOCUMENTS

| | | |
|---|---|---|
| 2019/0313436 A1 | 10/2019 | Lee et al. |
| 2022/0224456 A1* | 7/2022 | Yi .................... H04W 72/1268 |
| 2023/0033400 A1* | 2/2023 | Maso .................... H04L 5/0051 |
| 2024/0236996 A1* | 7/2024 | Fukui .................... H04W 76/20 |

OTHER PUBLICATIONS

Moderator (China Telecom) "[106-e-NR-R17-CovEnh-03] Summary of email discussion on joint channel estimation for PUSCH"; 3GPP TSG RAN WG1 #106-e R1-2108503; 138 pages; Aug. 16, 2021.

Moderator (China Telecom) "FL Summary of joint channel estimation for PUSCH"; 3GPP TSG RAN WG1 #106-e R1-2108221; 52 pages; Aug. 16, 2021.

Moderator (China Telecom) "106-e-NR-R17-CovEnh-03] FL Summary#2 of email discussion on joint channel estimation for PUSCH"; 3GPP TSG RAN WG1 #106-e R1-2108371; 87 pages; Aug. 16, 2021.

Nokia et al. "Joint channel estimation for PUSCH coverage enhancements"; 3GPP TSG RAN WG1 #106-e R1-2106657; 18 pages; Aug. 16, 2021.

International Search Report and Written Opinion for PCT/CN2021/119752; 8 pages; Jun. 14, 2022.

* cited by examiner

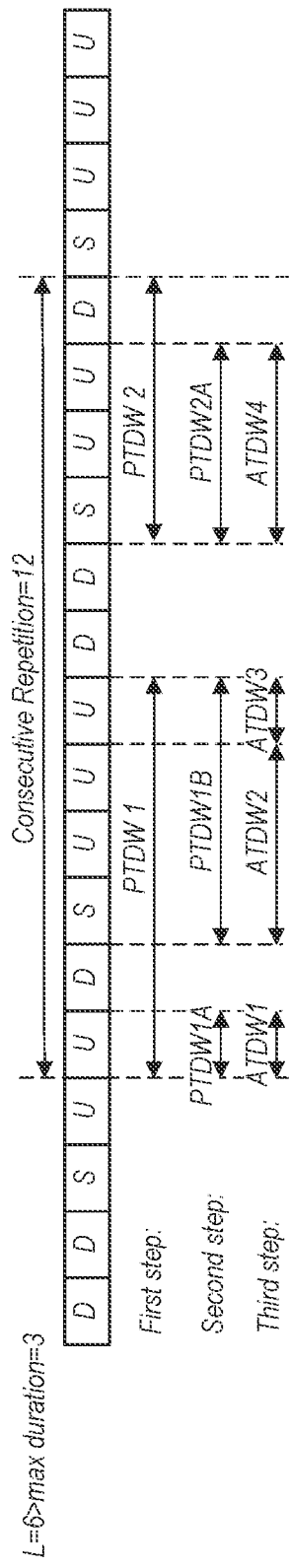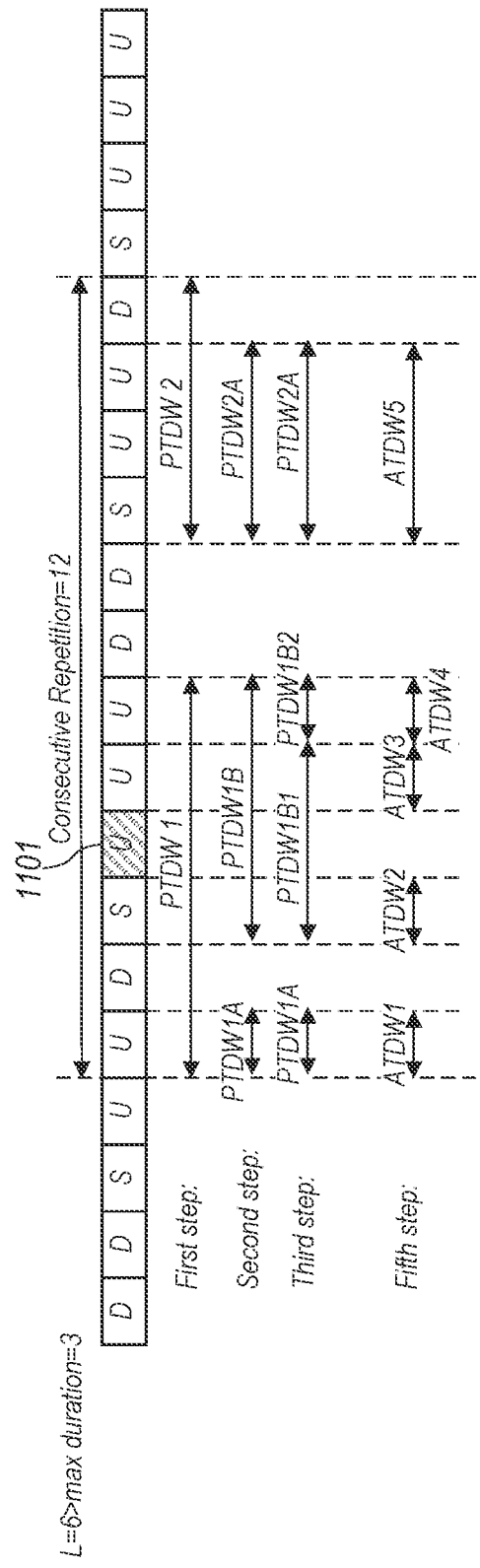

US 12,278,788 B2

TIME DOMAIN WINDOW DETERMINATION FOR WIRELESS COMMUNICATION

PRIORITY CLAIM

This application is a national phase entry of PCT application number PCT/CN2021/119752, entitled "Time Domain Window Determination for Wireless Communication," filed Sep. 23, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to determination of time domain windows for transmission while maintaining power consistency and/or phase continuity.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be transmission over a period of time (e.g., a number of slots, symbols, and/or milliseconds, etc.) while maintaining power consistency and/or phase continuity, e.g., to promote channel estimation. Improvements in the field are desired.

SUMMARY

Embodiments are presented herein of, inter alia, systems, apparatuses, and methods for performing packet filtering and related communications in a wireless communication system, e.g., New Radio (NR), LTE, etc.

As noted above, the number of use cases for wireless networks communicating with different classes of user equipment devices (UEs) with widely variable capabilities and usage expectations are growing. One usage expectation may include maintaining power consistency and/or phase continuity for one or more transmissions. Devices may exchange configuration information and determine appropriate windows of time for maintaining such transmission characteristics.

In some embodiments, a user equipment (UE) may establish communication with a base station and transmit, to the base station, a capability report, the capability report comprising an indication of a maximum duration of time that the UE is capable of transmitting with power consistency and/or phase continuity. The UE may from the base station, a schedule of uplink and/or downlink transmissions for a first period of time, the schedule comprising a first uplink transmission opportunity. The UE may determine a plurality of actual time domain windows for performing uplink transmission with power consistency and/or phase continuity during the first period of time. The first uplink transmission opportunity may be subdivided into at least first and second actual time domain windows. The plurality of actual time domain windows may be determined according to a plurality of rules for determination of actual time domain windows. The plurality of rules may comprise: determining separate preliminary time domain windows if an uplink transmission opportunity is interrupted by a downlink transmission opportunity; determining separate preliminary time domain windows if a length of a previous preliminary time domain window is greater than the maximum duration of time; and if an event modifies the schedule of uplink and/or downlink transmissions for the first period of time, adjusting any previous preliminary time domain window affected by the event. The UE may transmit information to the base station during the plurality of actual time domain windows, wherein power consistency and/or phase continuity is maintained during respective actual time domain windows.

In some embodiments, a method at a base station may comprise establishing communication with a user equipment (UE) and receiving from the UE, a capability report, the capability report comprising an indication of a maximum duration of time that the UE is capable of transmitting with power consistency and/or phase continuity. The method may further comprise transmitting, to the UE, a schedule of uplink transmission opportunities for a first period of time and determining a plurality of actual time domain windows for receiving uplink transmission with power consistency and/or phase continuity during the first period of time, wherein at least one uplink transmission opportunity is separated into two or more actual time domain windows according to a plurality of rules for determination of actual time domain windows. The plurality of rules may comprise one or more of: determining separate preliminary time domain windows when an uplink transmission opportunity is interrupted by a downlink transmission opportunity; determining separate preliminary time domain windows when a length of a previous preliminary time domain window is greater than the maximum duration of time; and/or determining whether an event modifies the schedule of uplink transmission opportunities for the first period of time, and, if the event modifies the schedule of uplink transmission opportunities for the first period of time, then adjusting a previous preliminary time domain window affected by the event. The method may further comprise receiving, from the UE, information during the uplink transmission opportunities during the first period of time, wherein power consistency and/or phase continuity is maintained during respective actual time domain windows of the plurality of actual time domain windows.

In some embodiments, an apparatus may comprise a processor configured to cause a UE to establish communication with a base station and transmit, to the base station, an indication of a maximum duration of time that the UE is capable of transmitting with power consistency and/or phase continuity. The UE may determine, based at least in part on information received from the base station, a schedule of uplink and/or downlink transmission opportunities for a first period of time. The UE may determine one or more actual time domain windows for uplink transmission, wherein at least one of the one or more actual time domain windows for uplink transmission is shorter than a corresponding uplink opportunity of the schedule of uplink and/or downlink transmission opportunities. The determination may be based on one or more of: application a configured length, L, to divide the first period of time into lengths no longer than L; a determination that uplink transmission opportunities of the schedule are separated by a downlink transmission opportunity; or a determination that a length of an uplink transmission opportunity or a previous preliminary time domain window is greater than the maximum duration of time. The UE may transmit information and reference signals to the base station during the one or more actual time domain windows, wherein power consistency and/or phase continuity is maintained during each respective actual time domain window of the one or more actual time domain windows.

The techniques described herein may be implemented in and/or used with a number of different types of devices, including but not limited to mobile telephones or smart phones (e.g., iPhone™, Android™-based phones), tablet computers (e.g., iPad™. Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6-13 illustrate aspects of determining time domain windows, according to some embodiments.

Figure 1:
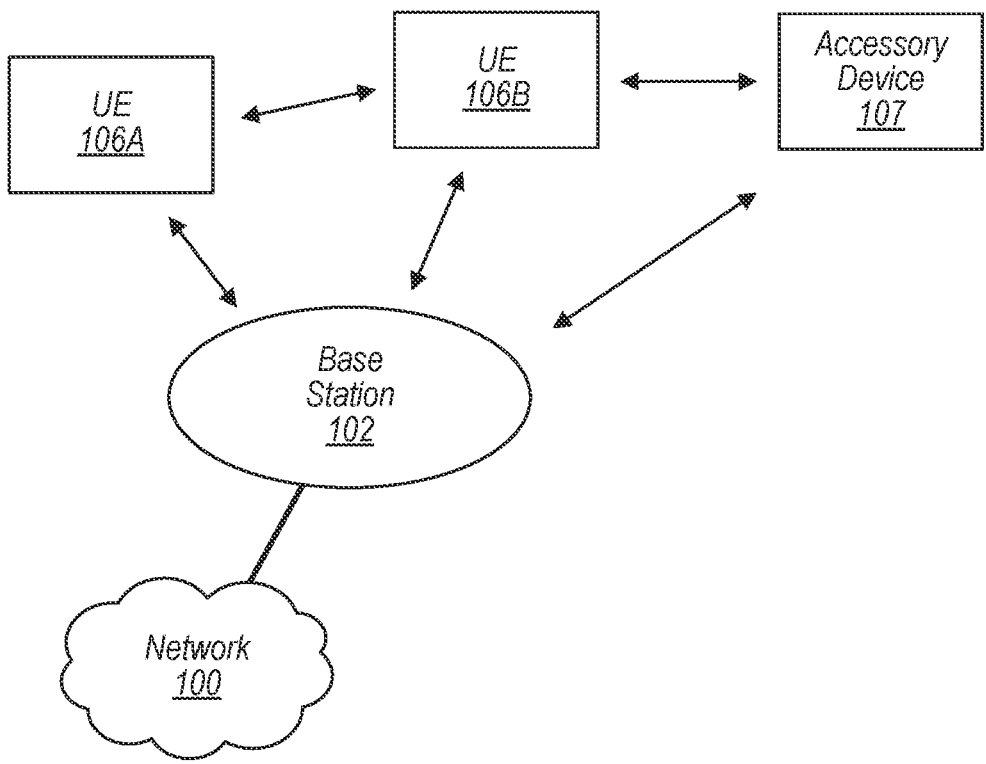
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media. e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited. e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
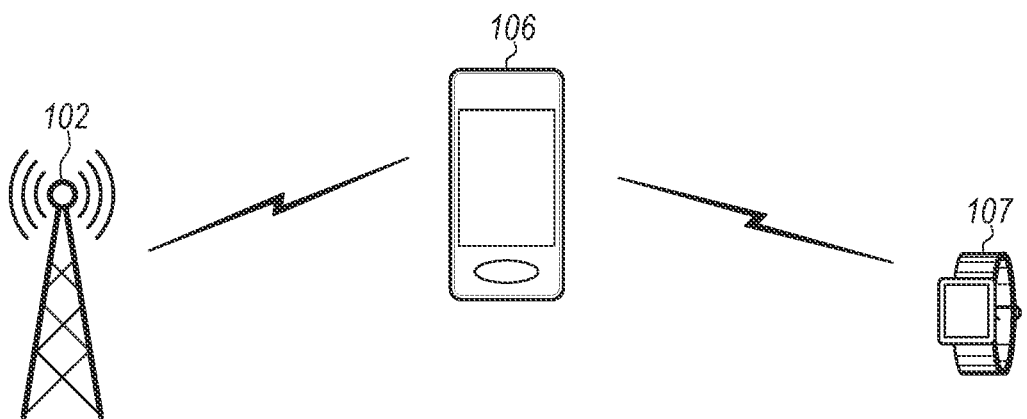
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A. NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
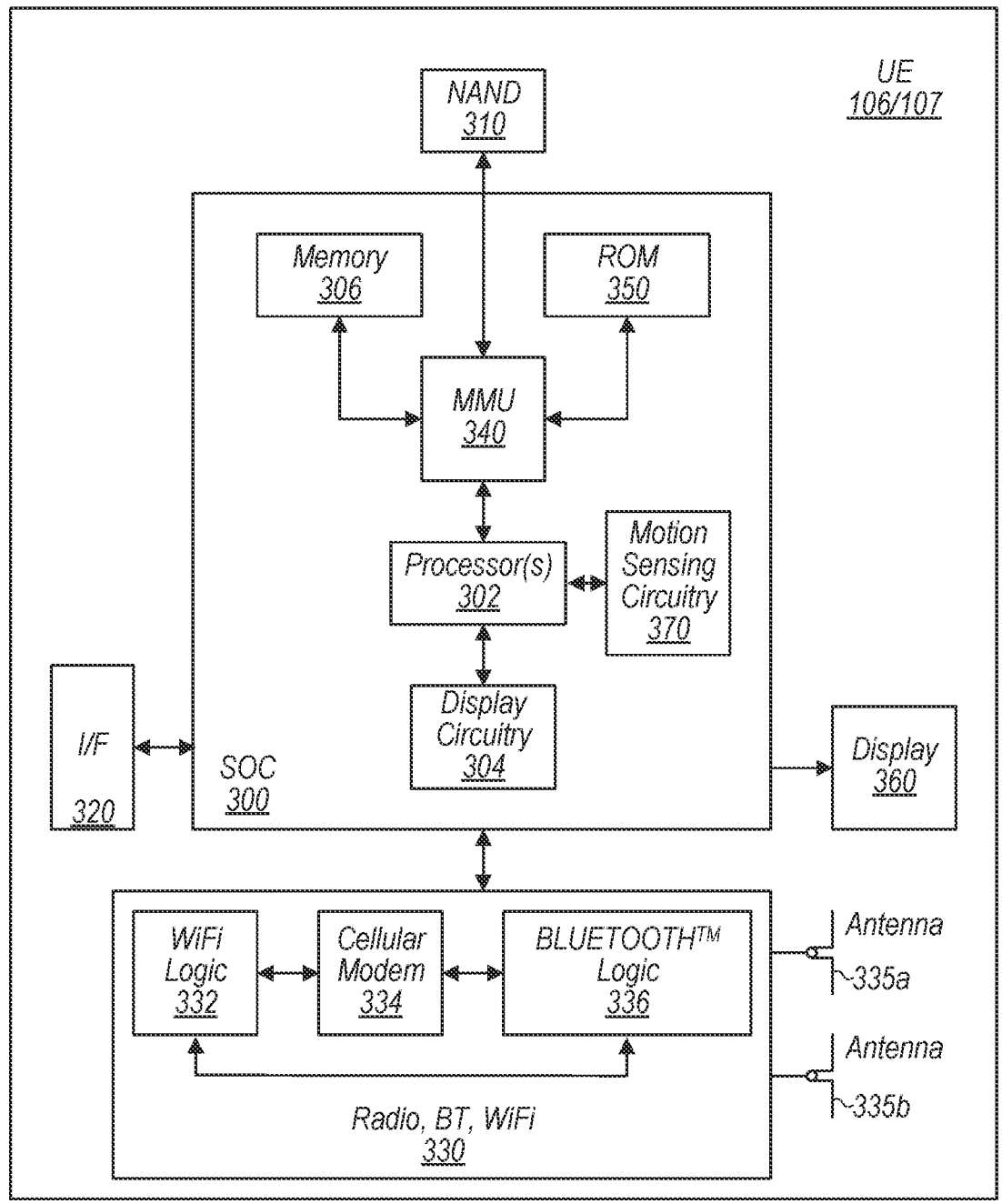
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR. CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
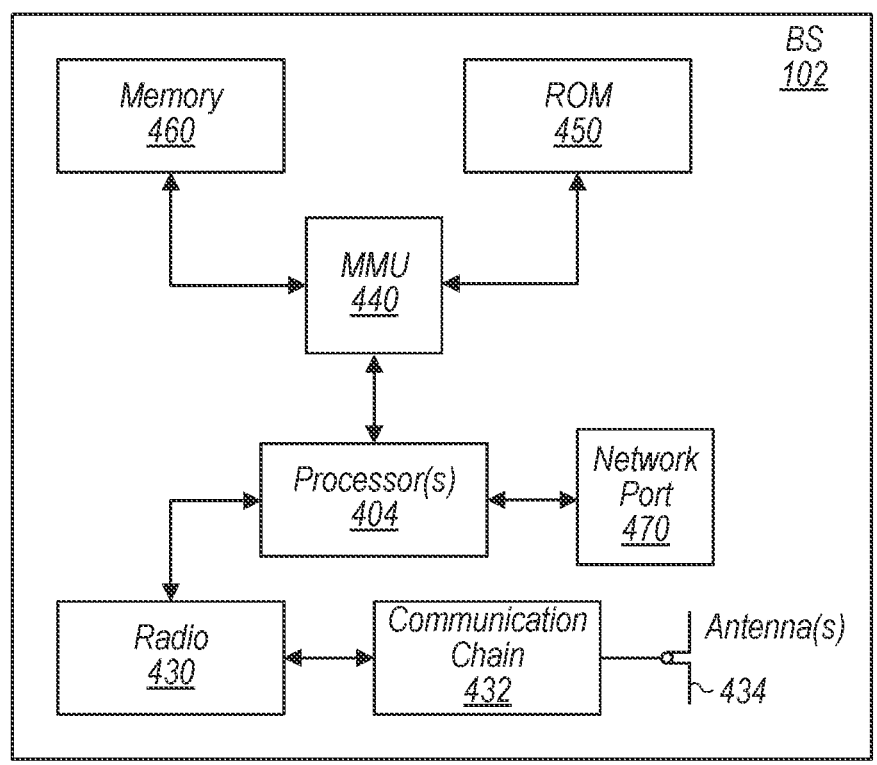
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR. LTE and Wi-Fi, LTE and UMTS. LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
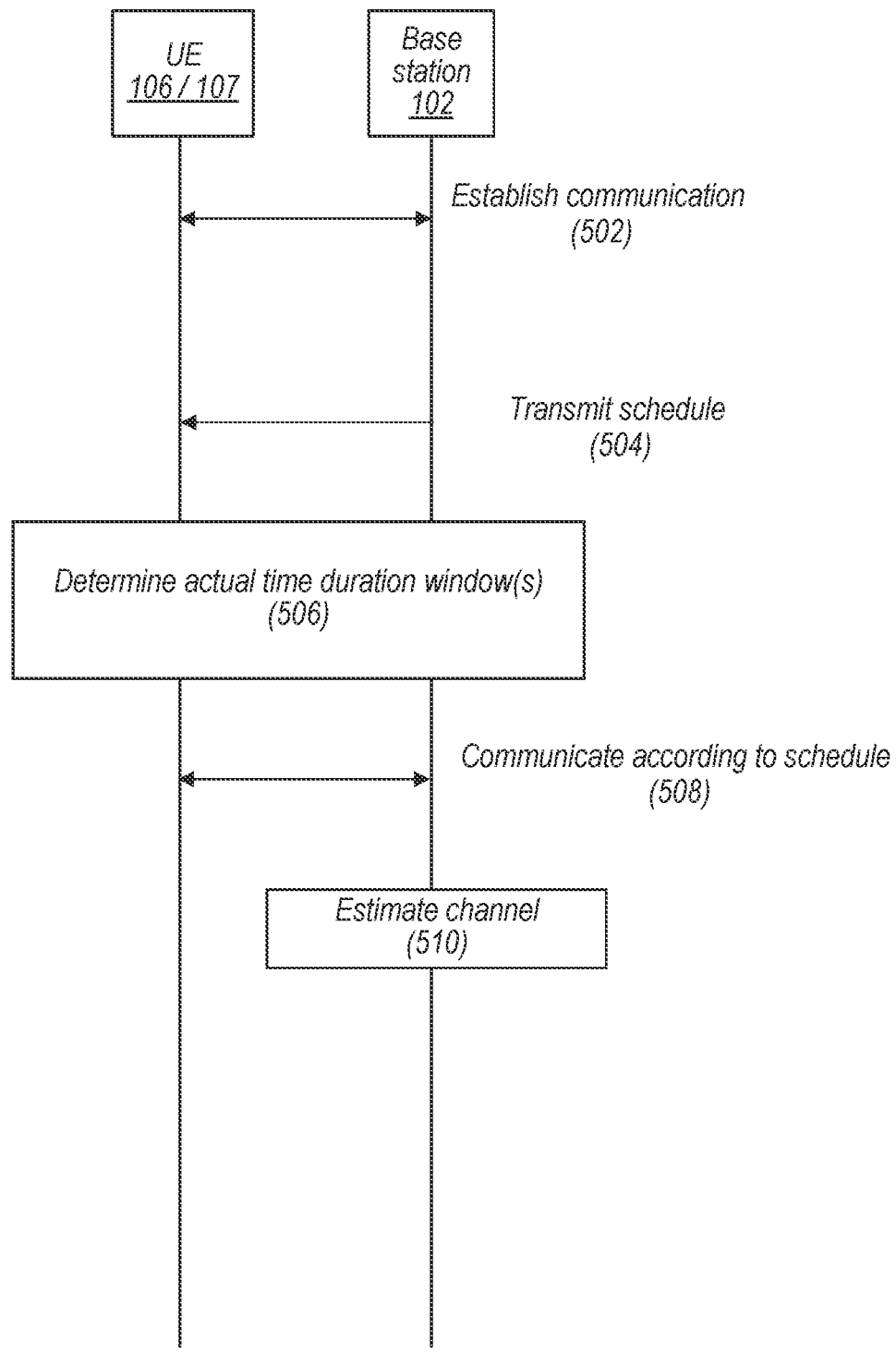
FIG. 5 is a communication flow diagram illustrating an example method for determining time domain windows, according to some embodiments.

FIG. 5—Determining Time Domain Windows

Transmissions, e.g., uplink (UL) transmissions, may be grouped in various ways. For example, transmissions may be grouped into multiple slots (and/or other time periods, such as symbols, etc.) according to techniques such as physical slot based repetition, available slot based repetition, and/or transport block (TB) processing over multi-slot (TBoMS).

In physical slot based repetition (e.g., also called consecutive repetition), a transmission (e.g., TB) may be repeated over a given number of consecutive slots or time periods. For example, if the number of time periods is 10, a UL transmission may be repeated in any UL time period within the range of 10 consecutive time periods. For example, if the 10 time periods are indexed from 0 to 9 and time periods 0-4 and 6-9 are scheduled for uplink transmissions and time period 5 is scheduled for downlink (DL), then the UL transmission may be repeated 9 times (e.g., once in each of time periods 0-4 and 6-9).

In available slot based repetition, a transmission (e.g., TB) may be repeated a given number of times over a series of time periods (e.g., until the given number of times is reached. For example, if the number of times is 10, the transmission may be repeated in each time period that is available for UL transmission (e.g., including UL and/or special (S) time periods) until 10 repetitions are performed. For example, if time periods 0-4 and 6-9 are scheduled for UL transmissions, time period 5 and 10 are scheduled for DL transmissions, and time period 11 is scheduled as a special period (and is hence considered available for UL), then the 10 repetitions may be completed over 12 time periods (e.g., 0 to 11, with transmissions occurring in all periods except 5 and 10). Available slot determination for available slot based repetition was discussed in the RAN1 #106-e meeting. For example, physical UL shared channel (PUSCH) repetitions may be counted on the basis of available slots according to the following two steps:

Step 1: A UE may determine available slots for a given number (e.g., K) repetitions based on radio resource control (RRC) configuration(s) in addition to time domain resource allocation (TDRA) in the DL control information (DCI) scheduling the PUSCH, configured grant (CG) configuration or activation DCI. For example, TDRA may describe how many symbols (and the positions of these symbols) are allocated for transmission. In step 1, TDRA may be used to identify whether any special slot is valid for UL transmission.

Step 2: The UE may determine whether to drop a PUSCH repetition or not, but any dropped PUSCH repetition may still be counted in the K repetitions. Further, for PUSCH repetition Type A, semi-static flexible symbol may be considered as available, e.g., for CG PUSCH and/or dynamic grant (DG) PUSCH.

According to TBoMS, a (e.g., single) TB (or packet, etc.) may be transmitted over a plurality of time periods (e.g., slots and/or symbols, etc.). For example, the number of time periods used to transmit the TB may depend on the length of the TB and/or other factors (e.g., modulation and coding scheme (MCS), etc.).

One application of grouping transmissions may include joint channel estimation (e.g., also referred to as demodulation (DM) reference signal (RS) (DM-RS) bundling. Joint channel estimation may include cross-slot channel estimation over consecutive slots, cross-slot channel estimation over non-consecutive slots, cross-repetition channel estimation within one slot, and inter-slot frequency hopping with inter-slot bundling to enable cross-slot channel estimation. For example, joint channel estimation over consecutive periods may be performed using transmissions grouped into multiple consecutive time periods. Relevant aspects of joint channel estimation may include: power consistency and phase continuity, DM-RS placement in special slot and DM-RS configuration.

Maintaining power consistency and phase continuity over grouped transmissions may support joint (e.g., cross-slot) channel estimation over multiple transmissions (e.g., multiple PUSCH transmissions). One relevant factor for determination of time windows with power consistency and phase continuity is a maximum time duration during which a UE is able to maintain power consistency and/or phase continuity, e.g., subject to power consistency and/or phase continuity requirements.

According to some embodiments, for joint channel estimation (e.g., for type A PUSCH repetitions of the same TB), all the repetitions may be covered by one or multiple consecutive or non-consecutive configured time domain windows (TDW). Each configured TDW may consist of one or multiple consecutive physical time periods (e.g., slots and/or symbols, etc.). The window length L of the configured TDWs may be explicitly configured with a single value. The start of the first configured TDW may be the first PUSCH transmission. The start of other configured TDWs may be implicitly determined prior to first repetition. The configured TDWs may be consecutive for paired spectrum and/or supplemental UL (SUL) band configurations. The end of the last configured TDW may be the end of the last PUSCH transmission. Within one configured TDW, one or multiple actual TDW (ATDW) may be implicitly determined. The start of the first actual TDW may be the first PUSCH transmission within the configured TDW. After one actual TDW starts, a UE may maintain the power consistency and phase continuity until one of the following conditions is met, then the actual TDW may be ended and power consistency and/or phase continuity may no longer be maintained. In other words, power and/or phase may be maintained during one ATDW and may be changed between one ATDW and the next. As one possible condition, the actual TDW may reach the end of the last PUSCH transmission within the configured TDW. As another possible condition, the actual TDW may reach the maximum duration. As another possible condition, an event may occur that violates power consistency and phase continuity. For example, the events may include e.g., a DL slot based on DL/UL configuration for unpaired spectrum, DL reception/monitoring occasion for unpaired spectrum, high priority transmission, frequency hopping, and/or precoder cycling. An event may be an instance which creates a break in the power consistency and/or phase continuity of UL transmission. An event may be a change in the purpose and/or transmission direction of a slot or other time period. For example, an event may change whether a slot is used for UL transmission and/or may change characteristics (e.g., power and/or phase) of a UL transmission. In some embodiments, the end of the ATDW may be the last available slot/symbol of the PUSCH transmission right before an event such that the power consistency and phase continuity are violated. If the power consistency and phase continuity are violated due to an event, whether anew ATDW is created may be subject to UE capability of supporting restarting DM-RS bundling. If the UE is capable of restarting DM-RS bundling, one new ATDW may be created after the event. The start of the new ATDW may be the first available slot/symbol for PUSCH transmission after the event. If the UE is not capable of restarting DM-RS bundling, no new ATDW may be created until the end of the configured TDW. In some embodiments, the UE capability of restarting DM-RS bundling may be applied only to dynamic event. In some embodiments, the UE capability of restarting DM-RS bundling may be applied to dynamic events and/or non-dynamic events.

Various standards may include various types of repetition (e.g., for PUSCH). For example, some standards may include type A and type B repetition. Type A repetition may be per slot repetition. In type A, the same TDRA may be applied for each UL slot. Type B repetition may repeat the TB within one slot. However, type B may preclude repetition across the slot boundary. Thus, in type B, the repetition may be restarted in the next slot. Time domain windows may apply to both repetition types.

FIG. 5 is a communication flow diagram illustrating an example method for determination of one or more ATDW, according to some embodiments. The method of FIG. 5 may allow for configuration of window length parameters and may address error propagation issues (e.g., time domain window length L longer than the maximum duration, in case of a UE missing an event). The method of FIG. 5 may include determination of the length of the ATDW(s) and the start of the configured TDWs, e.g., for unpaired spectrum. Further, the method of FIG. 5 may support half-duplex (HD) frequency division duplexing (FDD) (HD-FDD) UEs.

In various embodiments, some of the elements of the methods shown in FIG. 5 may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. Similarly, while at least some elements of the method of FIG. 5 are described in a manner relating to UL transmissions performed by a UE, it will be appreciated that aspects of the method of FIG. 5 may similarly be used for DL transmissions performed by a BS and/or transmissions between multiple UEs (e.g., sidelink and/or device to device (D2D) transmissions, etc.). For example, aspects of the method of FIG. 5 may be used to determine ATDW characteristics for DL, sidelink and/or D2D transmissions, according to some embodiments. Similarly, aspects of the method of FIG. 5 are described in a manner relating to physical slot based repetition, available slot based repetition and TB processing over multi-slot (TBoMS). However, the methods of FIG. 5 may also be applied to other transmission types. Further, the methods of FIG. 5 may apply to type A and/or type B repetition, among various possibilities. As shown, the method may operate as follows.

The UE and the BS may establish communication (502), according to some embodiments. The UE and the BS may communicate using one or more radio access technologies (RATs), e.g., including NR The UE and the BS may communicate using any frequency resources. The UE and the BS may communicate using one or more frequency carriers, e.g., including licensed and/or unlicensed carriers. Further, the UE and BS may use various duplexing techniques including full duplex, time division duplex (TDD), FDD, and/or half duplex, e.g., HD-FDD. The UE and BS may use supplemental bands/carriers, such as an SUL band. The UE and BS may use paired and/or unpaired spectrum. The BS may provide one or more cell and/or cell groups and the communication between the UE and the BS may use one or more cell and/or cell group.

The BS may exchange configuration information with the UE. For example, the BS may use radio resource control (RRC) and/or other higher layer signaling to negotiate parameters with the UE and/or to configure the UE. Among various possibilities, the configuration information may include various parameters relevant to joint channel estimation, DM-RS bundling, and/or determination of TDWs, etc.

As part of the exchange of configuration information, the UE may provide information (e.g., a capability report) to the BS describing its capabilities related to determination of time domain windows. For example, the UE may provide information about a maximum duration for which it can maintain power consistency and/or phase continuity. For example, the UE may report the maximum duration in the range of {2, 3, 4, 5, 6, 7, 8, 9, 10} slots, among various possibilities. Other maximum durations may be used as desired, e.g., including durations measured in symbols, ms, and/or other units of time. In some embodiments, the UE may indicate different durations for different connections (e.g., different cells, different carriers, different frequency ranges, etc.).

As part of the exchange of configuration, the UE and the BS may negotiate one or more configured TDW lengths L. For example, the BS may configure the UE with one or more L values. For example, an L value may be in the range {0, 2, 3, 4, 5, 6, 7, 8, 9, 10}, among various possibilities. In some embodiments, the BS may determine the L value based on maximum duration, e.g., based on UE capability information. According to some embodiments, an L value of 2 may mean the window length is 2 slots, 3 may mean 3 slots, etc.

However, an L value of 0 may have a different meaning, according to some embodiments. For example, an L value of 0 may indicate that the window length may be equal to all physical slots for transmission. This value of 0 may only be applied to TDD communications (e.g., NR TDD), according to some embodiments.

As one possibility, L may be less than or equal to the (e.g., relevant) maximum duration indicated by the UE.

As another possibility, L can be larger than the (e.g., relevant) maximum duration. In this case, a configured TDW may be divided into smaller ATDWs, as further discussed below.

It will be appreciated that other L values may be used as desired, e.g., including L values measured in symbols, ms, and/or other units of time and/or L values of greater than 10 slots. In some embodiments, different L values may be used for different connections (e.g., different UEs, different cells, different carriers, different frequency ranges, etc.). For example, an L value may be UE specific. As another example, different L values may be used for FDD and TDD communications, e.g., with the same cell or different cells.

In some embodiments, as part of the exchange of configuration, the UE and the BS may negotiate one or more rules for determining ATDWs. Thus, the UE and the BS may share a common set of rules for such determinations. In some embodiments, different rules may be used for different connections (e.g., different cells, different carriers, different frequency ranges, etc.). For example, a set of rules may be cell specific. As another example, different rules may be used for FDD and TDD communications, e.g., with the same cell or different cells. In some embodiments, some or all of the rules may be adopted in standards, and thus the UE and the BS may share the rules without exchanging any indication of the rules.

In some embodiments, the configuration information may be updated from time to time (e.g., periodically and/or as needed). Such an update may include modifying and/or replacing one or more parameter, e.g., a maximum duration of the UE and/or TDW length L.

The BS may transmit one or more indications of a schedule to the UE (504), according to some embodiments. The schedule may apply at least to a first period of time. The schedule may include one or more times (e.g., slots, symbols, etc.) for UL transmission and/or one or more times (e.g., slots, symbols, etc.) for DL transmission. For example, the schedule may include one or more UL transmission opportunity. A UL transmission opportunity may be a continuous time period for UL transmission (e.g., consisting of one or more contiguous times).

The schedule may be semi-static and/or dynamic. The BS may indicate the schedule using RRC, medium access control (MAC), and/or DCI signaling. The schedule may include duplexing, e.g., TDD, HD-FDD, etc. For example, the schedule may be or include a series of times (e.g., slots, symbols, etc.) some of which may be allocated for UL, some of which may be allocated for DL, and some of which may be allocated as "special" which may be considered available for UL and/or DL. The schedule may further include guard periods associated with changing transmission direction.

As one possibility, a duplexing schedule such as one or two TDD UL/DL pattern(s) may be configured semi-statically. The BS may dynamically indicate one or more changes to the schedule (e.g., using DCI, etc.).

The UE may determine the schedule, e.g., based on the indication(s) from the BS and possibly other information (e.g., standards).

In some embodiments, the UE may transmit, to the BS, one or more acknowledgement of the schedule and/or any changes to the schedule.

The UE and the BS may (e.g., separately) determine one or more actual time duration windows (506), according to some embodiments. The UE and BS may determine the ATDW(s) for the first period of time. For example, an uplink opportunity during the first period of time may be divided into one or more ATDW(s). An ATDW may be up to the length of a corresponding UL opportunity in the schedule. In other words, a UL opportunity may be separated into multiple ATDWs or the UL opportunity may not be separated and may be determined to be a single ATDW.

The UE and BS may use one or more rules (e.g., steps) to determine the ATDW(s), e.g., based on the schedule for the first period of time and the configuration information. For example, the UE and BS may determine the ATDWs from the UL/DL configuration, L, maximum duration, and dynamic signaling triggered events.

As the UE and BS may share a common set of rules, the UE and the BS may (e.g., separately) determine the same ATDW(s) in cases that both the UE and the BS share the same understanding of the schedule. However, in the event that the UE and BS do not share the same understanding of the schedule (e.g., because a DCI updating the schedule was not correctly received by the UE), it is possible that the UE and the BS may determine different ATDW(s).

For example, the BS and/or UE may divide a configured TDW may into one or more ATDW according to following steps. Time windows determined in the earlier steps may be referred to as "preliminary time domain windows" or "PDTW" in contrast to the "actual" windows (e.g., ATDW) determined in the final step.

In various embodiments, some of the steps may be performed concurrently, in a different order than shown, may be substituted for by other steps, or may be omitted. Additional steps may also be performed as desired.

First, the BS and/or UE may apply the configured length L to divide the first period of time into one or more PTDWs. This step may only apply if L is greater than 0. For example, e.g., for FDD repetition, if the first period of time is 13 slots and L is 5 slots, the first period may be divided into 3 PTDWs (e.g., slots 0-4, slots 5-9, and slots 10-12).

The BS and/or UE may determine the start and end of the PTDW(s) as follows. The start time (e.g., slot) of a first PTDW may be the first time (e.g., slot) for UL transmission. The first PTDW may include up to L times (e.g., slots) beginning from the first time. The end of a PTDW may be the Lth time or the end of the first period of time. The PTDWs may be consecutive. For example, a following PTDW may start from the first time for UL transmission after the end of the previous PTDW. The first time (e.g., slot) for UL transmission may be the first physical time (e.g., UL or special) for UL consecutive repetition and may be the first available time for available slot based repetition and TBoMS. For example, if the first physical time is a DL slot for consecutive repetition, then the DL slot(s) may be skipped until the next slot is UL slot, and this first UL slot may be the first slot for PTDW. As for available slot based repetition, the DL slot(s) and any un-usable UL slot(s) may be skipped, until the first available UL slot is the first slot for PTDW. For example, an un-usable UL slot may be a UL slot designated for another purpose and not available for repetition, among various possibilities.

Second, the BS and/or UE may determine whether a PTDW or UL transmission opportunity is broken (e.g., interrupted) by one or more DL transmission opportunity (e.g., slot(s), symbol(s), etc.) in a TDD UU/DL configuration. If the PTDW or UL transmission opportunity is broken, it may be divided into multiple PTDWs, e.g., before and after each interrupting DL transmission opportunity. See FIGS. 6 and 7 (discussed further below) for examples of the application of this step.

It will be appreciated that a PTDW or UL transmission opportunity may consist of any number of consecutive times (e.g., slots, symbols, etc.) that are available for UL transmission, including "special" slots, subframes, etc. A break or interruption in the PTDW or UL transmission opportunity may consist of one or more consecutive times (e.g., slots, symbols, etc.) that are not available for UL transmission (e.g., are designated for DL or guard period, etc.).

Further, it will be appreciated that a UL transmission opportunity may be broken multiple times, e.g., as long as the times that are not available for UL are not consecutive. For example, consider a schedule {U, S, D, U, D, D, U}, where "U" indicates UL, "D" indicates DL, and "S" indicates special. The UL transmission opportunity in this schedule is broken twice (e.g., by the "D" and "D, D" times) and thus may be divided into three PTDWs according to this step. In other words, following this step no PTDW may be broken or interrupted, e.g., each PTDW may include only times that are available for UL transmission.

Thus, following this step, the start time (e.g., slot) of a first PTDW may be the first allocated time (e.g., slot) for UL transmission. The end of a PTDW may be the earlier of: the last time (e.g., slot) for UL transmission, the last time (e.g., slot) of the first period of time, and/or the last time (e.g., slot) within the length L from the start time of the PTDW (e.g., if L>0). The PTDWs may be consecutive, e.g., a next PTDW may begin at the first time (e.g., slot) for UL transmission following the end of a previous PTDW.

If L=0, the PTDW length may equal to all consecutive times that are available for UL transmission.

According to some embodiments, this step may not be applied to NR FDD or supplementary UL (SUL) configurations.

Third, the BS and/or UE may determine whether a PTDW (e.g., following any applied previous step) is larger/longer than maximum duration. Any PTDW that is longer than the maximum duration may be subdivided into two or more PTDWs that are no longer than the maximum duration. For example, the length of the PTDW may be divided by the maximum duration, so that any number of PTDWs equal to the maximum duration are created and a last PTDW may include any remainder. For example, the first "new" PTDW may include a length equal to the maximum duration. The second or subsequent new PTDWs may include a length equal to the maximum duration or the remainder of the PTDW being divided in this step. Note that this subdivision may not merge any PTDWs previously separated in an earlier step, according to some embodiments.

Fourth, the BS and/or half-duplex FDD UE may determine whether any PTDW is conflicting with (e.g., overlapping) any synchronization signal block (SSB). If so, the PTDW may be subdivided, e.g., to avoid the SSB. For example, the PTDW will be divided into two PTDWs before and after the SSB transmission. In some embodiments, this step may only be applied in the context of HD-FDD operations. In some embodiments, the network may avoid scheduling that will result in an SSB colliding with PUSCH transmission(s). In some embodiments, this step may similarly be applied to one or more other types of RS. In some embodiments, this step may be most relevant to half-duplex FDD communications, thus any UE and/or BS performing other types of communications may skip this step, among various possibilities.

Fifth, the BS and/or UE may adjust any PTDW based on any relevant dynamic signaling triggered event, e.g., cancellation indication (CI), priority indication, slot format indication (SFI) (e.g., via DCI format 2_0, among various possibilities), or other events. For example, a CI may cancel a UL opportunity for a time (e.g., making the time, which was previously considered available for UL, now un-available for UL). As a result of such a CI, the PTDW including the cancelled UL time may be shortened (e.g., if the cancelled UL time is at the beginning or end of the PTDW) or divided into two PTDWs (e.g., resulting in one PTDW before the cancelled UL time and one after). As another example, a high priority PUSCH transmission may collide with a low priority PUSCH repetition at a particular time. The low priority PUSCH transmission may be cancelled. As a result, the power level and phase continuity could not be kept after the high priority PUSCH transmission. Accordingly, the PTDW that previously included the particular time may be shortened or divided (e.g., similar to the case of a CI). As another example, consider configured grant UL transmission type, e.g., without DCI triggering the transmission. A SFI may change a UL slot to DL slot. In this case the UL transmission for CG type 1 PUSCH repetition may be interrupted. As a result of such a SFI, the PTDW including the time switched to DL may be shortened (e.g., if the time switched to DL is at the beginning or end of the PTDW) or divided into two PTDWs (e.g., resulting in one PTDW before the time switched to DL and one after). As a further example, an SFI may change a flexible slot to a DL slot. The flexible slot (e.g., prior to the SFI) may be considered available for UL, however after the SFI, the DL slot may not be considered available. This may result in shortening or dividing a PTDW as discussed above.

In some embodiments, a transmission (e.g., whether UL or DL) scheduled by a dynamic grant (DG) may be considered as higher priority than a transmission (e.g., whether UL or DL) scheduled by a configured grant (CG). Accordingly, the higher priority transmission (e.g., scheduled by a DG) may be prioritized. Any PTDW(s) may be adjusted as needed to accommodate this prioritization.

In some embodiments, there may be a timing threshold to determine what is considered a dynamic signaling triggered event. For example, any event signaled prior to a threshold amount of time prior to the time of the changed transmission may be considered as part of the schedule (e.g., and thus addressed in the previous steps) while any event signaled subsequent to the threshold amount of time may be treated as a dynamic event in this step.

Following the completion of these steps (e.g., in order), the resulting PTDW(s) may be considered ATDW(s) for use in maintaining power consistency and/or phase continuity for transmission.

In some embodiments, the end of an ATDW may be the last time (e.g., slot) used for UL transmission in ATDW.

The following provide some examples in the case of HD-FDD repetition and/or TBoMS transmission.

As one possibility, the BS may configure a TDD UL/DL configuration pattern for HD-FDD UE (e.g., in 504). The UL transmission and DL reception may be based on the indication from the UL/DL configuration. The ATDW determination may follow the same steps discussed above.

As another possibility, all the UL slots may be considered as available for TDW determination. To determine ATDW, the BS and/or UE may proceed according to following steps. First, determine whether a PTDW is larger than maximum duration. If so, subdivide the PTDW as discussed above. Second, adjust for any dynamic signaling triggered event(s), similar to the discussion above. Regarding the dynamic signaling event(s), the following scenarios may be considered.

Scenario 1: dynamic grant (DG) DL transmission(s) (e.g., PDSCH) conflicts with a configured grant (CG) UL transmission. The DG PDSCH may be considered as a higher priority than the CG UL transmission. The BS and/or UE may divide the PTDW into two ATDW before/after the DL transmission(s).

Scenario 2: CG DL transmission(s) conflicts with a DG UL transmission. According to some embodiments, the DG UL transmission may be considered as higher priority. Accordingly, this may not be considered a valid event, and thus the UL transmission(s) may not be interrupted by the DL transmission(s). However, it will be appreciated that an additional ATDW may be added or an existing ATDW may be extended, e.g., associated with the additional UL transmission time. For example, if the additional UL transmission time interrupts a DL transmission or would cause an existing PTDW to violate another rule (e.g., by being longer than the maximum duration or longer than L), then the BS and/or UE may add an additional ATDW at the time of the additional UL transmission. Alternatively, if an existing PTDW can be extended to include the additional UL transmission time without violating any other rule, the BS and/or UE may extend the earliest PTDW that can be so extended.

Scenario 3: CG DL transmission(s) conflicts with CG UL transmission(s). This may not be considered a valid event, e.g., because both transmissions are associated with non-dynamic grants, e.g., of the same priority. In some embodiments, the UE may not expect this scenario to happen and the BS may avoid scheduling this scenario. In some embodiments, if this scenario does occur, it may be handled based on which slot arrives first. If the CG DL slot arrives first, CG UL transmission(s) may be dropped, e.g., which may result in shortening or splitting a PTDW. Otherwise, CG DL transmission(s) may be dropped, which may result in adding an additional PTDW or extending one, e.g., as in scenario 2.

Scenario 4: DG DL transmission(s) conflicts with DG UL transmission(s). As in scenario 3, this may not be considered a valid event, e.g., because both transmissions are associated with dynamic grants. e.g., of the same priority. In some embodiments, the UE may not expect this scenario to happen and the BS may avoid scheduling this scenario. In some embodiments, if this scenario does occur, it may be handled based on which slot arrives first. If the DG DL slot arrives first, the DG UL transmission(s) may be dropped. e.g., which may result in shortening or splitting a PTDW. Otherwise, DG DL transmission(s) may be dropped, which may result in adding an additional PTDW or extending one, e.g., as in scenario 2.

Scenario 5: SSB overlaps with DG UL transmission. In some embodiments, this may be considered an error case. Thus, the UE may not expect this scenario too happen and the BS may avoid scheduling this scenario. In some embodiments, if this scenario does occur, it may be treated as a valid event. Accordingly, the BS and/or UE may divide the PTDW of the added UL into two ATDWs before/after the SSB transmission. Similarly, in the case that an SSB overlaps with CG UL transmission, the BS and/or UE may divide the PTDW of the UL into two ATDWs before/after the SSB transmission.

The UE and the BS may communicate according to the schedule (508), according to some embodiments. For example, the UE may transmit to the BS during the UL opportunity(ies) of the first period of time. The UE may transmit during the one or more ATDWs (e.g., of respective UL opportunity(ies)) and may maintain power consistency and/or phase continuity during the respective ATDWs (e.g., individually). In other words, for the duration of a first ATDW, the UE may maintain power consistency and/or phase continuity while transmitting to the BS. Similarly, for the duration of a second ATDW, the UE may maintain power consistency and/or phase continuity while transmitting to the BS. However, the UE may not maintain power consistency and/or phase continuity between different ATDWs. For example, for the duration of the first ATDW, the UE may maintain power consistency at a first power level while transmitting to the BS and for the duration of the second ATDW, the UE may maintain power consistency at a second, different power level while transmitting to the BS. Similarly, the phase of the second ATDW may not be consistent with the first ATDW.

The UE may transmit RS with the UL transmission(s). For example, during an ATDW, the UE may transmit bundled DM-RS, e.g., DM-RS with power consistency and/or phase continuity. The UE may transmit DM-RS in different ATDWs with different power and/or without phase continuity.

It will be appreciated that, although the UE may not actively maintain power consistency and/or phase continuity across multiple ATDWs, that change in power level and/or phase may or may not occur. For example, multiple ATDWs may use a same power level, e.g., by coincidence.

The BS may estimate the channel based on transmissions from the UE during respective ATDWs of the one or more ATDW (510), according to some embodiments. For example, the BS may perform a first cross slot channel estimation of a first ATDW and a second cross slot channel estimation of a second ATDW. For example, the BS may use the DM-RS (and/or other RS and/or information) transmitted by the UE to perform the channel estimation for an ATDW. For purposes of the respective channel estimation(s), the BS may assume power consistency and/or phase continuity for the respective ATDW(s).

FIGS. 6-13—Examples of ATDW Determination

Figure 6:
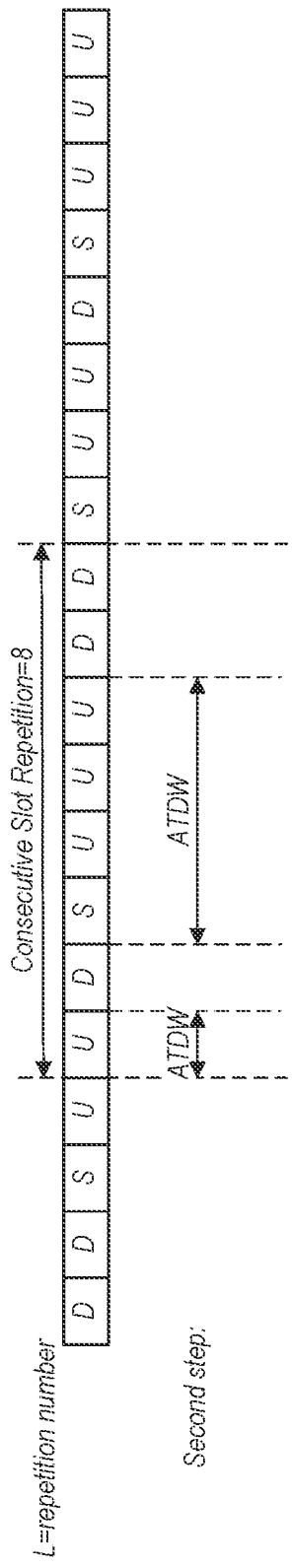
Figure 7:
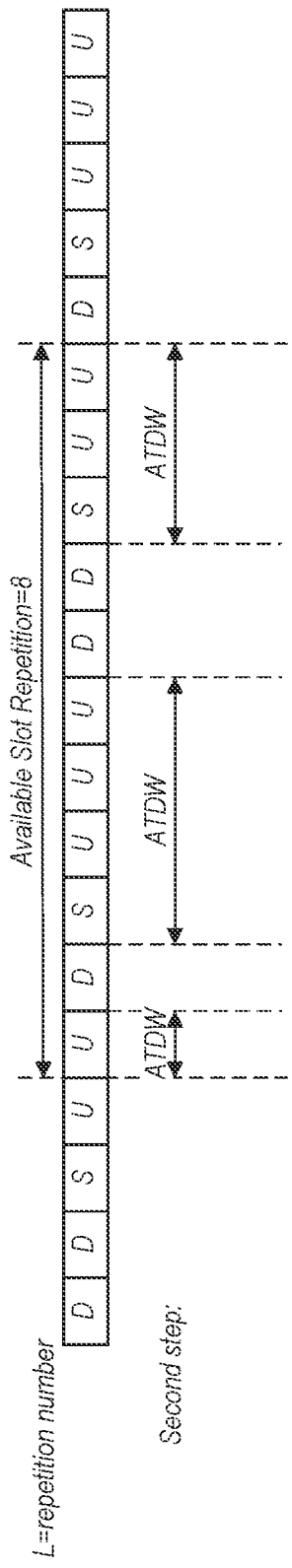

FIGS. 6 and 7 illustrate examples of ATDW determination with time domain window length set to equal to all consecutive times that are available for UL transmission (e.g., L=0). As noted above, with this configuration, the window length may be equal to all physical slots for transmission. The ATDW may be determined according to the DL slot in the UL/DL configuration. This may lead to efficiently using the consecutive UL slots to perform the DM-RS bundling transmission. The possibility for error propagation (e.g., due to the UE missing an event, e.g., not receiving a dynamic grant) is avoided by ATDW created by DL slots in the UL/DL configuration. In the illustrated examples, the "L=repetition number" may indicate that L=0. In the illustrated examples, it may be assumed that consecutive times for UL transmission (e.g., 4 slots) is smaller than maximum duration (e.g., 5 slots or more, not shown).

It will be appreciated that in these examples, L=0. Accordingly, the BS and/or UE may not apply the first step discussed in 506. These examples may illustrate the application of the second step.

FIG. 6 illustrates an example of physical slot based repetition (e.g., consecutive repetition) with 8 repetitions, according to some embodiments. The second step may result in changes to one or more time window. It will be appreciated that the BS and/or UE may also perform the other steps discussed in 506, but they are not illustrated (e.g., as no changes may occur).

As shown, during the first period of time (e.g., the 8 times indicated by "Consecutive Slot Repetition=8") there are two ATDWs, separated by the DL slot in the UL/DL pattern breaking the UL consecutive transmission (e.g., during S and U times). Due to the DL slot interrupting the UL transmission opportunity, phase continuity and power consistency may not be kept, according to some embodiments. Thus, the UL transmission is divided into two ATDWs as shown.

FIG. 7 illustrates an example of available slot based repetition, according to some embodiments. The second step may result in changes to one or more time window. As DL times are not available for UL repetition, there are more (in comparison to FIG. 6) total times in the first period of time (e.g., the 11 slots indicated by "Available Slot Repetition=8"). The first period of time may include 8 (e.g., S and U) times that may be used for UL transmission. The DL slot(s) divide these times into three ATDWs with different lengths, as shown.

Figure 8:
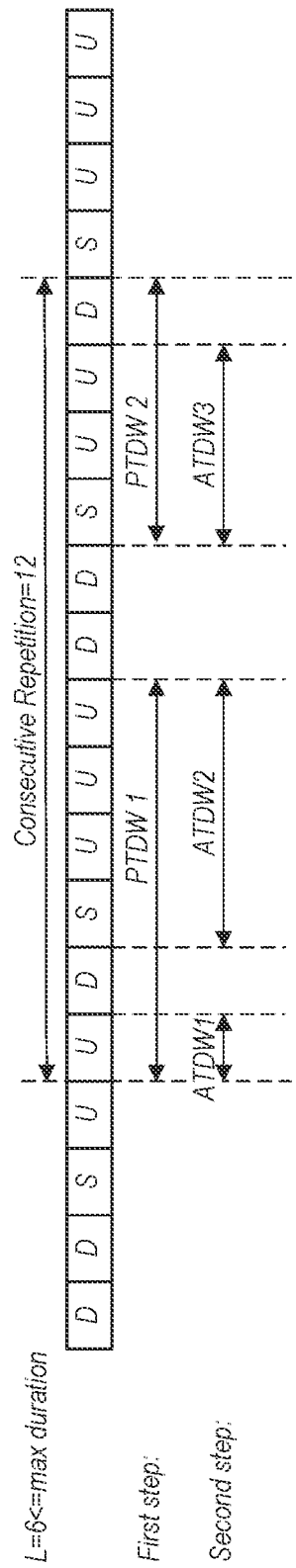
Figure 9:
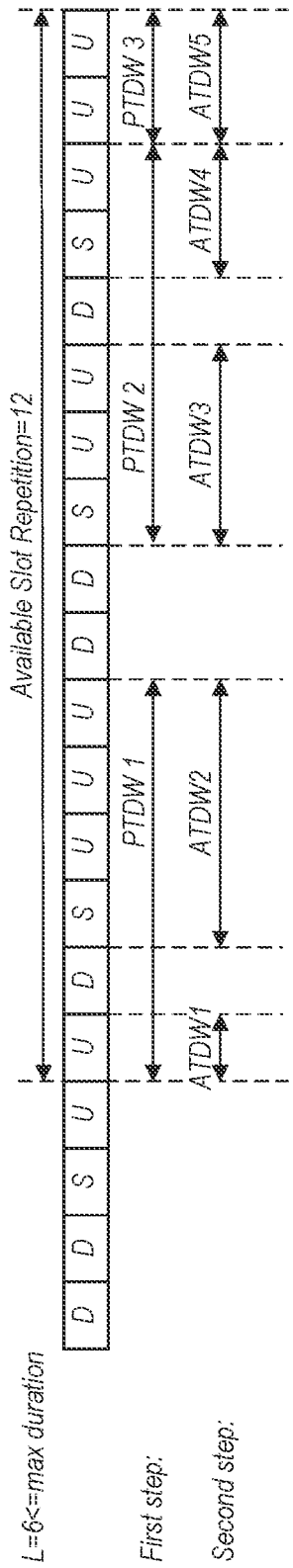

FIGS. 8 and 9 illustrate examples where the "L=6 slots" is smaller than maximum duration, according to some embodiments. These examples may illustrate application of the first step discussed in 506 and the second step discussed in 506.

FIG. 8 illustrates an example in context of physical slot based repetition with 12 repetitions, according to some embodiments. The first and second steps may result in changes to one or more time window.

In the first step, the first period of time is divided into two PTDWs of length less than or equal to L. The first PTDW, e.g., PTDW1, may last 6 slots. The second, e.g., PTDW2 may start at the first time for UL transmission, (e.g., the special slot) after the end of PTDW1. TDW2 lasts 4slots until the end of the transmission.

In the second step, PTDW1 may be split into two ATDWs (e.g., ATDWs 1 and 2) based on a break (e.g., a DL slot). The PTDW2 may be shortened based on a DL slot (e.g., resulting in ATDW3).

FIG. 9 illustrates an example context of available slot based repetition with 12 UL times over a first period of 16 times, according to some embodiments. The first and second steps may result in changes to one or more time window.

In the first step, PTDW1 may be similar to PTDW1 of FIG. 8. PTDW2 may start from the first slot for UL transmission after the end of PTDW1. PTDW2 may last 6 slots, e.g., PTDW2 may be equal to length L. PTDW3 may be consecutive with PTDW2, as the first slot after PTDW2 may be a UL slot.

In the second step, PTDW1 may be split into two ATDWs (e.g., ATDWs 1 and 2) based on a break (e.g., a DL slot), as in FIG. 8. PTDW2 may similarly be split into two ATDWs (e.g., ATDWs 3 and 4) based on a break (e.g., a DL slot). PTDW3 may be unchanged in the second step and may become ATDW5.

FIGS. 10 and 11 illustrate examples where, the "L=6 slots" is larger than maximum duration (e.g., 3 slots), according to some embodiments. Both figures are in the context of consecutive slot repetition and the first period of time includes 12 time periods.

FIG. 10 illustrates an example in which the first, second, and third steps result in changes to one or more time window, according to some embodiments.

In the first step, two PTDWs of length less than or equal to L are created, e.g., PTDWs 1 and 2. PTDW2 may begin at the first time available for UL transmission after the end of PTDW1.

In the second step, PTDW1, may be divided into two PTDWs (1A and 1B) based on the break (e.g., the DL time). PTDW2 may be shortened based on the DL time (e.g., becoming PTDW2A).

In the third step, the BS and/or UE may determine that PTDW1B is larger than maximum duration (e.g., 3 slots). Therefore, BS and/or UE may divide PTDW1B into ATDWs (e.g., ATDW2 and ATDW3). As neither of PTDW1A nor PTDW2A are longer than the maximum duration, these may be unchanged in the third slot and may become ATDWs 1 and 4, respectively.

FIG. 11 illustrates an example in which the first, second, third and fifth steps result in changes to one or more time window, according to some embodiments. In FIG. 11, a dynamic event may occur. Specifically, the UL opportunity 1101 may be cancelled (e.g., via cancellation indication transmitted by the BS and received by the UE). Prior to the cancellation, the schedule for the first period of FIG. 11 may be the same as in FIG. 10. Accordingly, the first, second and third steps may proceed as described above with respect to FIG. 10 (except that in the third step of FIG. 11 the windows are labeled as PTDWs to reflect the fact that they are not yet finalized).

It will be appreciated that the dynamic signaling triggered event, e.g., in which UL opportunity 1101 is cancelled may occur at any time relative to the evaluation of the steps. For example, 1101 may be cancelled prior to evaluation of steps 1-3, during the evaluation of steps 1-3, or after the evaluation of steps 1-3.

In the fifth step, the BS and/or UE may determine that the cancellation of UL opportunity 1101 creates a break in PTDW1B1. Accordingly, the BS and/or UE may divide PTDW1B1 into ATDW2 and ATDW3. The remaining PTDWs may not be affected by the dynamic event.

As noted above, the dynamic signaling triggered event has the lowest priority (e.g., is addressed in the last step). Therefore, the impact of a potential missed dynamic event is minimized, e.g., relative to other possible ordering of the steps in which dynamic events may be addressed earlier. For instance, if dynamic event is applied before the maximum duration (e.g., in the third step in the order described in 506), then there would be three ATDWs derived from PTDW1 (e.g., instead of 4 as in FIG. 11). In other words, this hypothetical alternative ordering of steps may result in the combination of ATDW3 and ATDW4 as a single ATDW.

Thus, if the UE misses (e.g., does not successfully receive) the UL cancellation, then the UE may assume different ATDWs than the BS.

Figure 12:
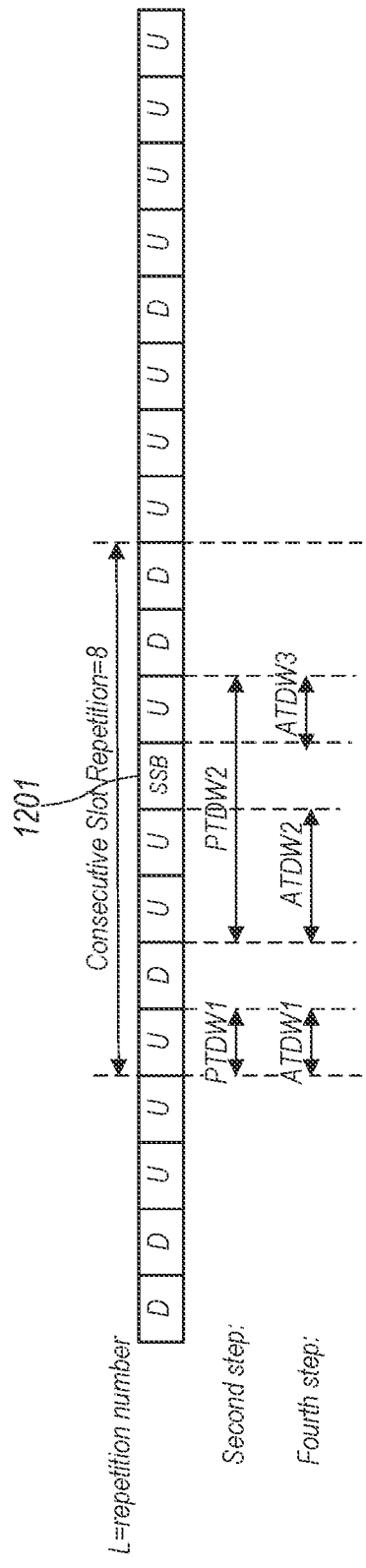

FIG. 12 illustrates an example of physical slot based repetition (e.g., consecutive repetition) with 8 repetitions, according to some embodiments. The schedule of FIG. 12 may include SSB 1201 as well as various U and D times. The second and fourth steps may result in changes to one or more time window.

In the second step, PTDWs 1 and 2 may be created, e.g., based on the DL breaks.

In the fourth step, PTDW2 may be divided into ATDWs 2 and 3, e.g., based on the SSB in time 1201. In some embodiments, the SSB case may be for half-duplex FDD communication, thus there may be no configured TDD UL/DL pattern.

Figure 13:
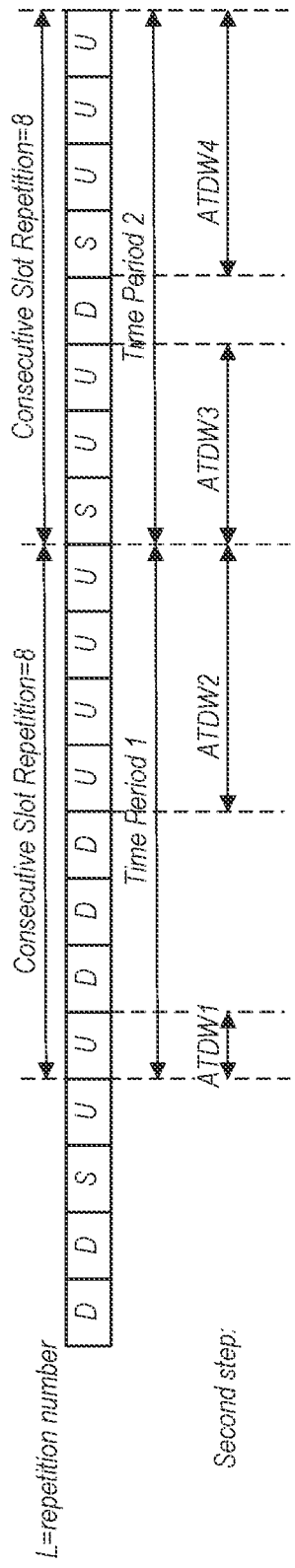

FIG. 13 illustrates an example of physical slot based repetition (e.g., consecutive repetition) with 8 repetitions including 2 time periods, according to some embodiments.

It will be appreciated that the BS and/or UE may apply the method of FIG. 5 to any number of consecutive periods of time, e.g., time periods 1 and 2, as shown. For example, in 504, the BS may transmit indications of respective schedules for the respective time periods. The schedules may repeat or may be different. In 506, the UE and the BS may determine ATDWs for each of the time periods. The UE and/or the BS may determine ATDWs for multiple time periods concurrently, or at different times (e.g., sequentially).

The time periods may have the same length (e.g., as in the illustrated example) or may have different lengths (not shown).

The schedule of the time period 1 of FIG. 12 is similar to that of FIG. 6. As in FIG. 6, L may be equal to 0. Therefore, the PTDWs may have any length in the first and second steps (e.g., potentially longer than the maximum duration).

In the second step, the BS and/or UE may determine ATDWs 1 and 2. Note that the end of ATDW2 may be determined based on the end of time period 1, e.g., even though the beginning of time period 2 (e.g., S) is available for UL transmission. Further, in the second step, the BS and/or UE may determine ATDWs 3 and 4. ATDW 3 may begin in the first time available for UL transmission.

In some embodiments, the method of FIG. 5 may not separate PTDWs based on the time periods. Thus, in such cases, ATDW3 may be combined with ATDW2.

Additional Information and Embodiments

In some embodiments, a user equipment (UE) may establish communication with a base station and transmit, to the base station, a capability report, the capability report comprising an indication of a maximum duration of time that the UE is capable of transmitting with power consistency and/or phase continuity. The UE may receive, from the base station, a schedule of uplink and/or downlink transmissions for a first period of time. The UE may determine one or more actual time domain windows for performing uplink transmission with power consistency and/or phase continuity during the first period of time, wherein the one or more actual time domain windows are determined according to a plurality of rules for determination of actual time domain windows. The plurality of rules may comprise one or more of: determining separate preliminary time domain windows if an uplink transmission opportunity is interrupted by a downlink transmission opportunity; determining separate preliminary time domain windows if a length of a previous preliminary time domain window is greater than the maximum duration of time; and/or if an event modifies the schedule of uplink and/or downlink transmissions for the first period of time, adjusting any previous preliminary time domain window affected by the event. The UE may transmit information to the base station during the one or more actual time domain windows, wherein power consistency and/or phase continuity is maintained during each respective actual time domain window of the one or more actual time domain windows.

In some embodiments a method at a base station may comprise establishing communication with a user equipment (UE) and receiving from the UE, a capability report, the capability report comprising an indication of a maximum duration of time that the UE is capable of transmitting with power consistency and/or phase continuity. The method may further comprise transmitting, to the UE, a schedule of uplink and/or downlink transmissions for a first period of time and determining one or more actual time domain windows for receiving uplink transmission with power consistency and/or phase continuity during the first period of time, wherein the one or more actual time domain windows are determined according to a plurality of rules for determination of actual time domain windows. The plurality of rules may comprise one or more of: determining separate preliminary time domain windows when an uplink transmission opportunity is interrupted by a downlink transmission opportunity; determining separate preliminary time domain windows when a length of a previous preliminary time domain window is greater than the maximum duration of time; and/or determining whether an event modifies the schedule of uplink and/or downlink transmissions for the first period of time, and, if the event modifies the schedule of uplink and/or downlink transmissions for the first period of time, then adjusting a previous preliminary time domain window affected by the event. The method may further comprise receiving, from the UE, information during the one or more actual time domain windows, wherein power consistency and/or phase continuity is maintained during each respective actual time domain window of the one or more actual time domain windows.

In some embodiments, an apparatus may comprise a processor configured to cause a UE to establish communication with a base station and transmit, to the base station, an indication of a maximum duration of time that the UE is capable of transmitting with power consistency and/or phase continuity. The UE may determine, based at least in part on information received from the base station, a schedule of uplink and/or downlink transmission opportunities for a first period of time. The UE may determine one or more actual time domain windows for uplink transmission based on one or more of: application a configured length, L, to divide the first period of time into lengths no longer than L; a determination that uplink transmission opportunities of the schedule are separated by a downlink transmission opportunity; or a determination that a length of an uplink transmission opportunity or a previous preliminary time domain window is greater than the maximum duration of time. The UE may transmit information and reference signals to the base station during the one or more actual time domain windows, wherein power consistency and/or phase continuity is maintained during each respective actual time domain window of the one or more actual time domain windows.

In a first set of embodiments, a user equipment (UE) may establish communication with a base station and transmit, to the base station, a capability report, the capability report comprising an indication of a maximum duration of time that the UE is capable of transmitting with power consistency and/or phase continuity. The UE may from the base station, a schedule of uplink and/or downlink transmissions for a first period of time, the schedule comprising a first uplink transmission opportunity. The UE may determine a plurality of actual time domain windows for performing uplink transmission with power consistency and/or phase continuity during the first period of time. The first uplink transmission opportunity may be subdivided into at least first and second actual time domain windows. The plurality of actual time domain windows may be determined according to a plurality of rules for determination of actual time domain windows. The plurality of rules may comprise: determining separate preliminary time domain windows if an uplink transmission opportunity is interrupted by a downlink transmission opportunity; determining separate preliminary time domain windows if a length of a previous preliminary time domain window is greater than the maximum duration of time; and if an event modifies the schedule of uplink and/or downlink transmissions for the first period of time, adjusting any previous preliminary time domain window affected by the event. The UE may transmit information to the base station during the plurality of actual time domain windows, wherein power consistency and/or phase continuity is maintained during respective actual time domain windows.

In some embodiments, the processor is further configured to cause the UE to: receive, from the base station, an indication of a configured time domain window length, wherein the indication of the configured time domain window length is set to a value indicating that, for a respective uplink transmission of the schedule of uplink and/or downlink transmissions for the first period of time, the configured time domain window length is equal to a respective length of time for the respective uplink transmission.

In some embodiments, the processor is further configured to cause the UE to: receive, from the base station, an indication of a configured time domain window length, wherein the configured time domain window length is UE specific.

In some embodiments, the processor is further configured to cause the UE to: receive, from the base station, an indication of a configured time domain window length, wherein the configured time domain window length is cell specific.

In some embodiments, determining the plurality of actual time domain windows according to the plurality of rules comprises applying the plurality of rules according to a set order, the set order comprising: first, determining separate preliminary time domain windows if an uplink transmission is interrupted by a downlink transmission opportunity; second, determining separate preliminary time domain windows if a length of a previous preliminary time domain window is greater than the maximum duration of time; and third, if an event modifies the schedule of uplink and/or downlink transmissions for the first period of time, adjusting any previous preliminary time domain window affected by the event.

In some embodiments, the plurality of rules further comprising: determining separate preliminary time domain windows if any previous preliminary time domain window overlaps a synchronization signal block transmission.

In some embodiments, the processor is further configured to cause the UE to: receive, from the base station, an indication of a configured time domain window length, the plurality of rules further comprising applying the configured time domain window length to divide the first period of time into one or more preliminary time domain windows, wherein said applying the configured time domain window length is performed prior to other rules of the plurality of rules.

In some embodiments, at least one of power consistency and/or phase continuity changes between the first and second actual time domain windows.

In a second set of embodiments, a method at a base station may comprise establishing communication with a user equipment (UE) and receiving from the UE, a capability report, the capability report comprising an indication of a maximum duration of time that the UE is capable of transmitting with power consistency and/or phase continuity. The method may further comprise transmitting, to the UE, a schedule of uplink transmission opportunities for a first period of time and determining a plurality of actual time domain windows for receiving uplink transmission with power consistency and/or phase continuity during the first period of time, wherein at least one uplink transmission opportunity is separated into two or more actual time domain windows according to a plurality of rules for determination of actual time domain windows. The plurality of rules may comprise one or more of: determining separate preliminary time domain windows when an uplink transmission opportunity is interrupted by a downlink transmission opportunity; determining separate preliminary time domain windows when a length of a previous preliminary time domain window is greater than the maximum duration of time; and/or determining whether an event modifies the schedule of uplink transmission opportunities for the first period of time, and, if the event modifies the schedule of uplink transmission opportunities for the first period of time, then adjusting a previous preliminary time domain window affected by the event. The method may further comprise receiving, from the UE, information during the uplink transmission opportunities during the first period of time, wherein power consistency and/or phase continuity is maintained during respective actual time domain windows of the plurality of actual time domain windows.

In some embodiments, the method may further comprise: receiving, from the UE, reference signals associated with the information during the plurality of actual time domain windows, wherein power consistency and/or phase continuity is maintained for the reference signals during the respective actual time domain windows of the plurality of actual time domain windows; and performing, based on the reference signals, respective channel estimations for the respective actual time domain windows of the plurality of actual time domain windows.

In some embodiments, the plurality of rules further comprises: applying a configured time domain window length to divide the uplink transmission opportunities of the first period of time into one or more preliminary time domain windows; and determining separate preliminary time domain windows if any previous preliminary time domain window overlaps a synchronization signal block transmission.

In some embodiments, the following rule applies (e.g., only) to half duplex FDD communication: determining separate preliminary time domain windows if any previous preliminary time domain window overlaps a synchronization signal block transmission.

In some embodiments, determining the plurality of actual time domain windows according to the plurality of rules comprises applying the plurality of rules according to a set order, the set order comprising: first, applying the configured time domain window length to divide the first period of time into one or more preliminary time domain windows; second, determining separate preliminary time domain windows when an uplink transmission opportunity is interrupted by a downlink transmission opportunity; third, determining separate preliminary time domain windows when a length of a previous preliminary time domain window is greater than the maximum duration of time; fourth, determining separate preliminary time domain windows if any previous preliminary time domain window overlaps a synchronization signal block transmission; and fifth, determining whether an event modifies the schedule of uplink transmission opportunities over the first period of time, and, if the event modifies the schedule of uplink transmission opportunities over the first period of time, then adjusting a previous preliminary time domain window affected by the event.

In some embodiments, the method may further comprise: transmitting, to the UE, an indication of the configured time domain window length.

In some embodiments, the method may further comprise: dividing a longer period of time into a plurality of periods of time, the plurality of periods of time including at least the first period of time and a second period of time; and determining a second one or more actual time domain windows for receiving uplink transmissions with power consistency and/or phase continuity during the second period of time, wherein the second one or more actual time domain windows are determined according to the plurality of rules.

In some embodiments, the method may further comprise: determining to update the schedule of uplink transmission opportunities over the first period of time; and in response to determining to update the schedule of uplink transmission opportunities over the first period of time, transmitting, to the UE an indication of the update using dynamic signaling, wherein the update comprises an event modifying the schedule of uplink transmission opportunities over the first period of time.

In a third set of embodiments, an apparatus may comprise a processor configured to cause a UE to establish communication with a base station and transmit, to the base station, an indication of a maximum duration of time that the UE is capable of transmitting with power consistency and/or phase continuity. The UE may determine, based at least in part on information received from the base station, a schedule of uplink and/or downlink transmission opportunities for a first period of time. The UE may determine one or more actual time domain windows for uplink transmission, wherein at least one of the one or more actual time domain windows for uplink transmission is shorter than a corresponding uplink opportunity of the schedule of uplink and/or downlink transmission opportunities. The determination may be based on one or more of; application a configured length, L, to divide the first period of time into lengths no longer than L; a determination that uplink transmission opportunities of the schedule are separated by a downlink transmission opportunity; or a determination that a length of an uplink transmission opportunity or a previous preliminary time domain window is greater than the maximum duration of time. The UE may transmit information and reference signals to the base station during the one or more actual time domain windows, wherein power consistency and/or phase continuity is maintained during each respective actual time domain window of the one or more actual time domain windows.

In some embodiments, the determination of the one or more actual time domain windows is performed sequentially, wherein a first step comprises the application the configured length, L, to divide the first period of time into preliminary time domain windows with lengths no longer than L.

In some embodiments, a second step comprises: a determination of whether any uplink transmission opportunity of the schedule not previously separated into preliminary time domain windows are separated by a downlink transmission opportunity; and separating any such uplink transmission opportunity into respective preliminary time domain windows prior to and subsequent to the downlink transmission opportunity.

In some embodiments, a third step comprises: a determination of whether a length of any previous preliminary time domain window is greater than the maximum duration of time; and separating any previous preliminary time domain window with a length greater than the maximum duration of time into respective preliminary time domain windows with respective lengths less than or equal to the maximum duration of time.

In some embodiments, a fourth step comprises: a determination of whether any previous preliminary time domain window is affected by an event indicated by dynamic signaling received from the base station; and modifying any previous preliminary time domain window that is affected by an event based on the event.

In some embodiments, the determination of the one or more actual time domain windows is further based on a modification of the schedule based on dynamic signaling received from the base station, wherein the dynamic signaling comprises one or more of: a cancellation indication; or a priority indication; or a slot format indication.

In various embodiments, various combinations of the embodiments described above may be combined together.

Yet another exemplary embodiment may include a method, comprising: by a wireless device; performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
a radio; and
a processor operably coupled to the radio and configured to cause the UE to:
establish communication with a base station;
transmit, to the base station, a capability report, the capability report comprising an indication of a maximum duration of time that the UE is capable of transmitting with power consistency and/or phase continuity;
receive, from the base station, a configured time domain window length, wherein the configured time domain window length is less than or equal to the maximum duration of time and is greater than zero;
receive, from the base station, a schedule of uplink transmissions for a first period of time, the schedule comprising a first uplink transmission opportunity;
determine a plurality of actual time domain windows for performing uplink transmission with power consistency and/or phase continuity during the first period of time, wherein the first uplink transmission opportunity is subdivided into at least first and second actual time domain windows, wherein the plurality of actual time domain windows are determined according to a plurality of rules for determination of actual time domain windows, the plurality of rules comprising:
apply the configured time domain window length to divide the first period of time into preliminary time domain windows (PTDWs), wherein a length of a first PTDW is the configured time domain window length and a length of a second PTDW is either the configured time domain window length or a remainder of the first period of time, wherein a start time of a first PTDW of the PTDWs is a first slot for the uplink transmission wherein a start time of a following PTDW of the PTDWs is a first slot for the uplink transmission after an end of a previous PTDW of the PTDWs;
divide the PTDWs based on:
if an uplink transmission opportunity is interrupted by a downlink transmission opportunity; and
if a cancellation indication modifies the schedule of the uplink transmission;
consider the PTDWs to be the plurality of actual time domain windows; and
transmit information to the base station during the plurality of actual time domain windows, wherein power consistency and/or phase continuity is maintained during respective actual time domain windows.

2. The UE of claim 1, wherein the configured time domain window length is set to a value indicating that, for a respective uplink transmission of the schedule of uplink transmissions for the first period of time, the configured time domain window length is equal to a respective length of time for the respective uplink transmission.

3. The UE of claim 1, wherein the configured time domain window length is UE specific.

4. The UE of claim 1, wherein determining the plurality of actual time domain windows according to the plurality of rules comprises applying the plurality of rules according to a set order.

5. The UE of claim 1, the plurality of rules further comprising:
determining separate preliminary time domain windows if any previous preliminary time domain window overlaps a synchronization signal block transmission.

6. The UE of claim 1, wherein said applying the configured time domain window length is performed prior to other rules of the plurality of rules.

7. The UE of claim 1, wherein at least one of power consistency or phase continuity changes between the first and second actual time domain windows.

8. A method, comprising:
at a base station:
establishing communication with a user equipment (UE);
receiving from the UE, a capability report, the capability report comprising an indication of a maximum duration of time that the UE is capable of transmitting with power consistency and/or phase continuity;
transmitting, to the UE, a configured time domain window length, wherein the configured time domain window length is less than or equal to the maximum duration of time and is greater than zero;
transmitting, to the UE, a schedule of uplink transmission opportunities for a first period of time;
determining a plurality of actual time domain windows for receiving uplink transmission with power consistency and/or phase continuity during the first period of time, wherein at least one uplink transmission opportunity is separated into two or more actual time domain windows according to a plurality of rules for determination of actual time domain windows, the plurality of rules comprising:
apply the configured time domain window length to divide the first period of time into preliminary time domain windows (PTDWs), wherein a length of a first PTDW is the configured time domain window length and a length of a second PTDW is either the configured time domain window length or a remainder of the first period of time, wherein a start time of a first PTDW of the PTDWs is a first slot for the uplink transmission wherein a start time of a following PTDW of the PTDWs is a first slot for the uplink transmission after an end of a previous PTDW of the PTDWs;
divide the PTDWs based on:
if an uplink transmission opportunity is interrupted by a downlink transmission opportunity; and
if a cancellation indication modifies the schedule of the uplink transmission;
considering the PTDWs to be the plurality of actual time domain windows; and
receiving, from the UE, information during the plurality of actual time domain windows, wherein power consistency and/or phase continuity is maintained during respective actual time domain windows of the plurality of actual time domain windows.

9. The method of claim 8, further comprising:
receiving, from the UE, reference signals associated with the information during the plurality of actual time domain windows, wherein power consistency and/or phase continuity is maintained for the reference signals during the respective actual time domain windows of the plurality of actual time domain windows; and
performing, based on the reference signals, respective channel estimations for the respective actual time domain windows of the plurality of actual time domain windows.

10. The method of claim 8, the plurality of rules further comprising:
determining separate preliminary time domain windows if any previous preliminary time domain window overlaps a synchronization signal block transmission.

11. The method of claim 10, wherein determining the plurality of actual time domain windows according to the plurality of rules comprises applying the plurality of rules according to a set order.

12. The method of claim 8, wherein at least one of power consistency or phase continuity changes between first and second actual time domain windows.

13. The method of claim 8, further comprising:
dividing a longer period of time into a plurality of periods of time, the plurality of periods of time including at least the first period of time and a second period of time; and
determining a second one or more actual time domain windows for receiving uplink transmissions with power consistency and/or phase continuity during the second period of time, wherein the second one or more actual time domain windows are determined according to the plurality of rules.

14. The method of claim 8, further comprising:
determining to update the schedule of uplink transmission opportunities over the first period of time; and
in response to determining to update the schedule of uplink transmission opportunities over the first period of time, transmitting, to the UE an indication of the update using dynamic signaling, wherein the update comprises an event modifying the schedule of uplink transmission opportunities over the first period of time.

15. A method, comprising:
at a user equipment (UE):
establishing communication with a base station;
transmitting, to the base station, a capability report, the capability report comprising an indication of a maximum duration of time that the UE is capable of transmitting with power consistency and/or phase continuity;

receiving, from the base station, a configured time domain window length, wherein the configured time domain window length is less than or equal to the maximum duration of time and is greater than zero;

receiving, from the base station, a schedule of uplink transmissions for a first period of time, the schedule comprising a first uplink transmission opportunity;

determining a plurality of actual time domain windows for performing uplink transmission with power consistency and/or phase continuity during the first period of time, wherein the first uplink transmission opportunity is subdivided into at least first and second actual time domain windows, wherein the plurality of actual time domain windows are determined according to a plurality of rules for determination of actual time domain windows, the plurality of rules comprising:

apply the configured time domain window length to divide the first period of time into preliminary time domain windows (PTDWs), wherein a length of a first PTDW is the configured time domain window length and a length of a second PTDW is either the configured time domain window length or a remainder of the first period of time, wherein a start time of a first PTDW of the PTDWs is a first slot for the uplink transmission wherein a start time of a following PTDW of the PTDWs is a first slot for the uplink transmission after an end of a previous PTDW of the PTDWs;

divide the PTDWs based on:
  if an uplink transmission opportunity is interrupted by a downlink transmission opportunity; and
  if a cancellation indication modifies the schedule of the uplink transmission;

considering the PTDWs to be the plurality of actual time domain windows; and transmitting information to the base station during the plurality of actual time domain windows, wherein power consistency and/or phase continuity is maintained during respective actual time domain windows.

16. The method of claim 15, wherein the configured time domain window length is set to a value indicating that, for a respective uplink transmission of the schedule of uplink transmissions for the first period of time, the configured time domain window length is equal to a respective length of time for the respective uplink transmission.

17. The method of claim 15, wherein the configured time domain window length is UE specific.

18. The method of claim 15, wherein determining the plurality of actual time domain windows according to the plurality of rules comprises applying the plurality of rules according to a set order.

19. The method of claim 15, the plurality of rules further comprising:
determining separate preliminary time domain windows if any previous preliminary time domain window overlaps a synchronization signal block transmission.

20. The method of claim 15, wherein said applying the configured time domain window length is performed prior to other rules of the plurality of rules.

* * * * *